A. L. BINGHAM.
GLASS MACHINE.
APPLICATION FILED JAN. 14, 1910.

1,125,895.

Patented Jan. 19, 1915.

4 SHEETS—SHEET 2.

Witnesses
Frank A. Fahle
Thomas W. McMeans

Inventor
Alvah L. Bingham,
By Bradford & Hood,
Attorneys

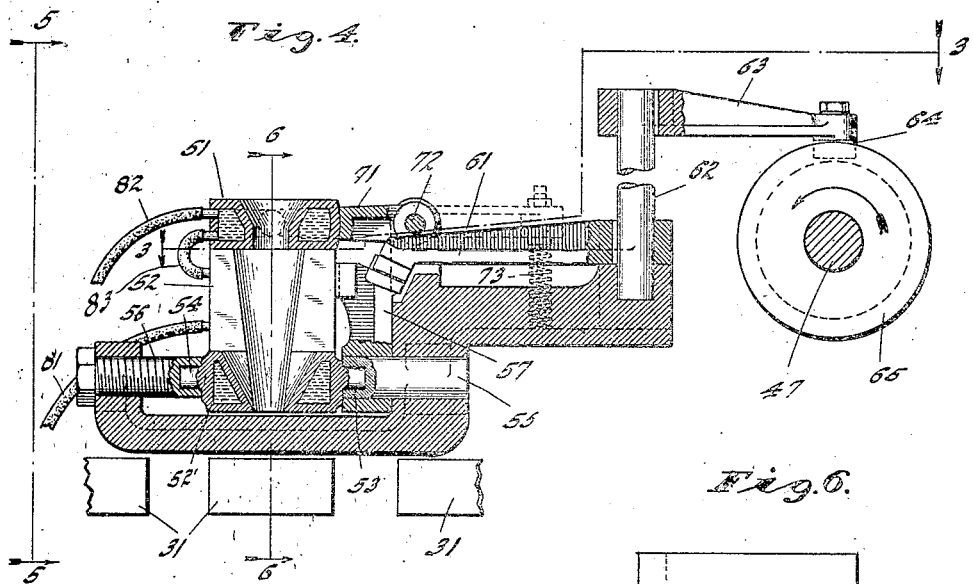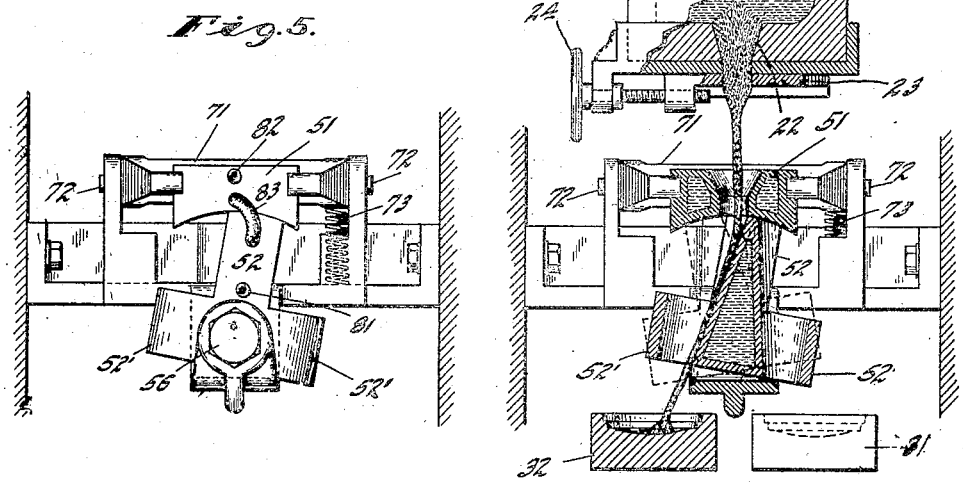

A. L. BINGHAM.
GLASS MACHINE.
APPLICATION FILED JAN. 14, 1910.

1,125,895.

Patented Jan. 19, 1915.
4 SHEETS—SHEET 4.

Witnesses
Frank A. Fahle
Thomas W. McMeans

Inventor
Alvah L. Bingham,
by Bradford & Hood,
Attorneys.

UNITED STATES PATENT OFFICE.

ALVAH L. BINGHAM, OF MUNCIE, INDIANA, ASSIGNOR TO BALL BROTHERS GLASS MANUFACTURING COMPANY, OF MUNCIE, INDIANA, A CORPORATION OF INDIANA.

GLASS-MACHINE.

1,125,895.

Specification of Letters Patent.

Patented Jan. 19, 1915.

Application filed January 14, 1910. Serial No. 538,015.

*To all whom it may concern:*

Be it known that I, ALVAH L. BINGHAM, a citizen of the United States, residing at Muncie, in the county of Delaware and State of Indiana, have invented a certain new and useful Glass-Machine, of which the following is a specification.

The object of my present invention is to provide a means whereby a plurality of sets of molds or other glass receivers, or a plurality of molding machines may be supplied by a single stream of glass from a single source of supply.

Said invention consists, generally speaking, in providing, in connection with the sets of molds or machines in question, a single device arranged below the orifice in the furnace from which the stream of glass emerges, so positioned and constructed as to serve as a shear member, and a shifting member adapted to coöperate with the said device to sever the stream of glass and direct it first into a glass-receiver (as a mold or mold-member) of one set or machine, and then into a glass-receiver of the other set or machine, and so on, alternately, the said sets of glass receivers or machines being advanced to receiving position synchronously with the shifting of the severing device, preferably with a step-by-step movement.

Figure 1:
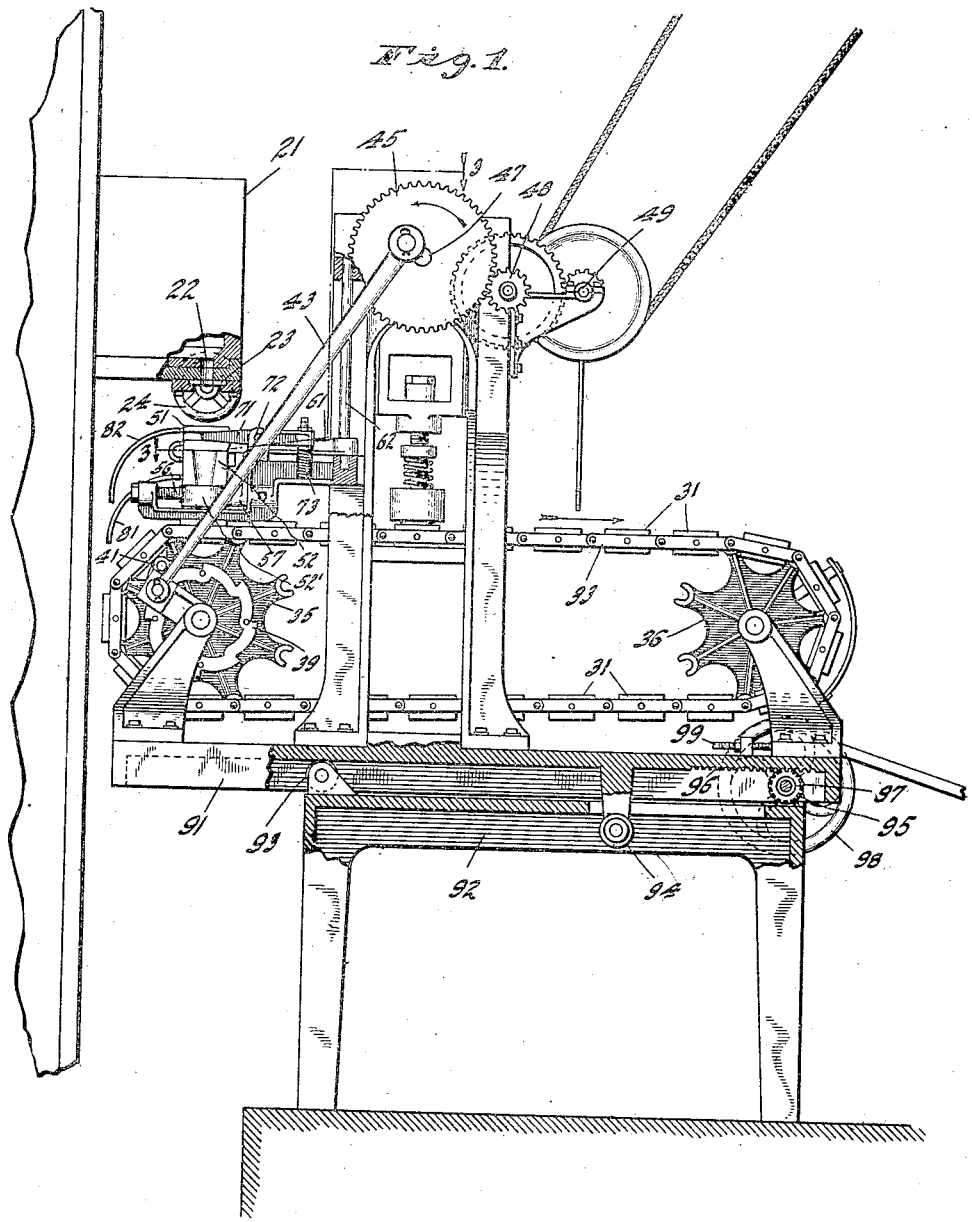
Figure 2:
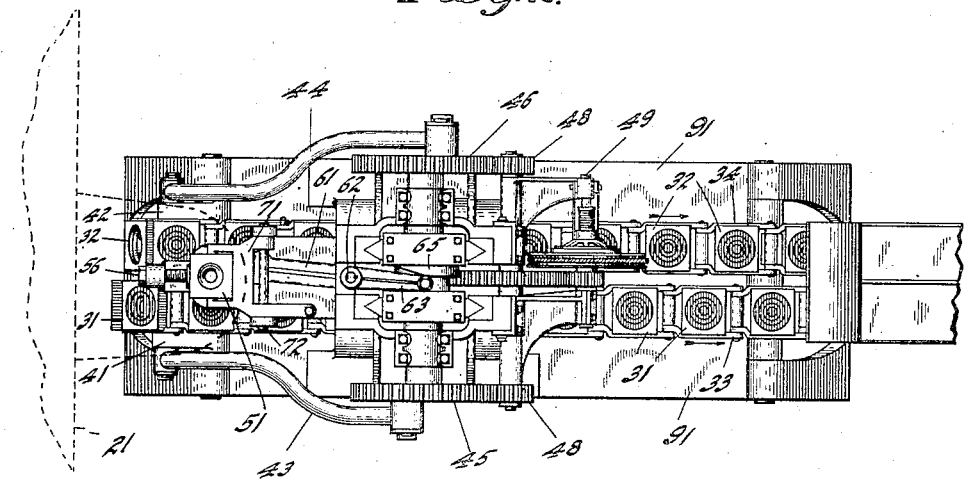
Figure 3:
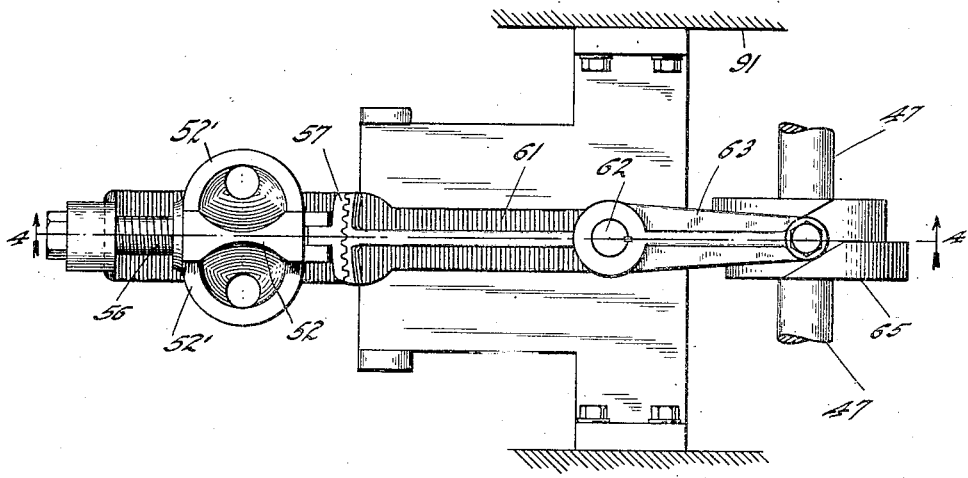
Figure 7:
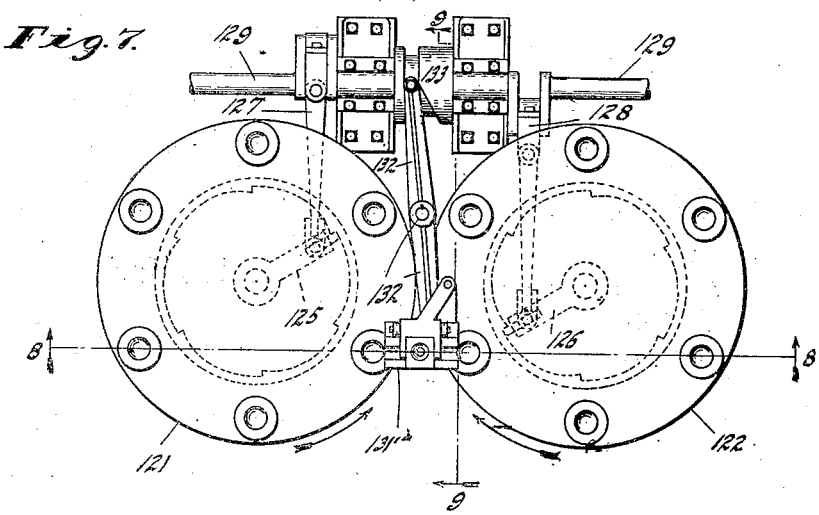
Figure 8:
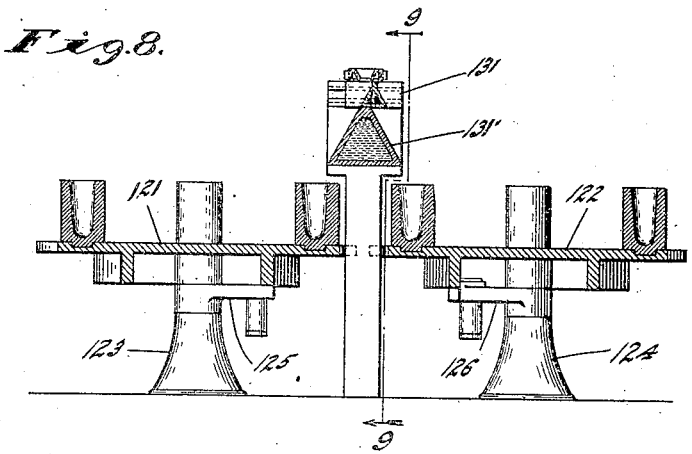
Figure 9:
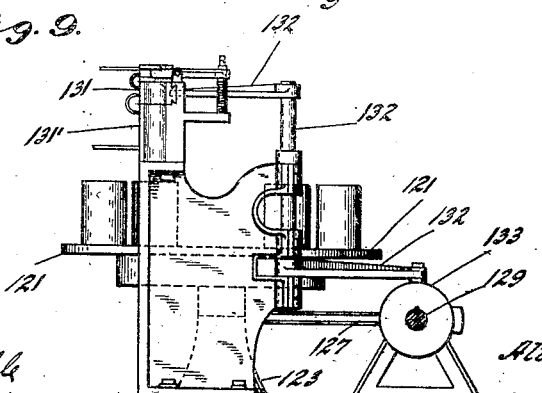

Referring to the accompanying drawings, which are made a part hereof, and on which similar reference characters indicate similar parts, Figure 1 is a side elevation of a glass molding machine of the type embodying two sets of mold-members arranged in parallel lines and adapted to advance with a step-by-step movement in parallel paths, and provided with a glass supplying apparatus embodying my present invention; Fig. 2 a top or plan view thereof; Fig. 3 a plan-sectional view, on an enlarged scale, as seen when looking downwardly from the broken line 3 3 in Figs. 1 and 4; Fig. 4 a detail vertical sectional view as seen when looking in the direction indicated by the arrows from the broken line 4 4 in Fig. 3; Fig. 5 an elevation as seen when looking in the direction indicated by the arrows from the broken line 5 5 in Fig. 4; Fig. 6 a detail sectional view at the point indicated by the broken line 6 6 in Fig. 4 and showing the furnace outlet and a glass stream; Fig. 7 a top or plan view of so much of two rotary-table glass-making machines as is necessary to illustrate the use of my invention therewith; Fig. 8 a vertical sectional view as seen when looking in the direction indicated by the arrows from the broken line 8 8 in Fig. 7, and Fig. 9 a vertical sectional view as seen when looking in the direction indicated by the arrows from the broken line 9 9 in Figs. 7 and 8. Figs. 7, 8 and 9 also (see especially Fig. 8) illustrate an alternative construction of the shifting cut-off device.

This machine is designed to operate in a position close to a glass furnace, 21, from which the molten glass flows through a mouth 22, which mouth is preferably adjustably controlled as to size by the slide 23, which may be conveniently operated by a hand wheel 24. For these parts see Fig. 1.

The machine illustrated in Figs. 1 to 6 inclusive, is, as heretofore stated, of that type which embodies two parallel sets of traveling molds or mold-members. These molds 31 and 32 are shown as carried by endless mold-carriers 33 and 34. The carrier 33 runs over a suitable set of carrier wheels 35 and 36, and the carrier 34 runs over a similar set of wheels (not visible in the drawings) on the same shafts therewith. Alongside the wheel 35 is a ratchet wheel 39, and in a similar position on the other side is a similar ratchet wheel. Pawls 41 and 42 are adapted to engage with said ratchet-wheels, and these are operated by connecting rods 43 and 44 extending to wrist pins on crank wheels 45 and 46 on opposite ends of a shaft 47 which is driven (preferably through intermediate gearing 48) from driving shaft 49, as will be readily understood from inspection of Figs. 1 and 2 of the drawing.

The devices to which my present invention especially relates are best illustrated in detail in Figs. 4 and 6. In Fig. 6, particularly, there is shown interposed between the sets of molds or glass-receivers 31 and 32 and the device 51 (which is shown as of a hopper or funnel shape and which is placed below the outlet opening of the furnace and serves as the upper shear member) the shifting cut-off and guiding device 52 which serves as the lower shear member. In the construction illustrated in these drawings, this part 52 is shown as pivoted at a lower central point, and adapted to swing on such pivot from side to side below part 51 constituting a shear for severing the stream of glass. To this end, the under side of part 51 is preferably in the form of an arc of a circle, and the upper end of part 52 is correspondingly formed to operate in conjunction therewith. Said device or member 52 widens from its upper to its lower end, so that its extreme lower corners are sufficiently far apart to enable it to guide the stream of molten glass first into a mold or glass receiver of one set and then into a mold or glass receiver of another set, and the lower end is provided with guard walls 52' which serve to insure that the molten glass shall not be thrown sidewise as member 52 is rocked from side to side. In the position indicated by full lines in Fig. 6, the flow would be into mold 32, while in the position indicated by the dotted lines in said figure, the flow would be into mold 31. As the arrangement (in the illustrated construction) is such, as will be presently described, that a mold of one of these sets advances to receiving position while the molds of the other set are at rest, the flow of glass is enabled to be continuous—a mold of one set being filled while the corresponding mold of the other set is advanced to position, and so on, continuously, as long as is desired. The peculiar characteristics of molten glass render this result very desirable. Besides the considerable increase in speed of operation, a better and more even degree of heat can be maintained, as the flow is uninterrupted and uniform, and the stream of glass is larger than can be utilized when there is an intermittent checking of the flow during the time or periods when the molds are advancing. The flow being gaged accurately, all the portions of glass are uniform in size, temperature and consistency, so that a uniform product substantially free from imperfections, can be secured.

The part or member 52 is given its operation by means of a connection running back to the same shaft 47 from which the advancing movement is imparted to the molds, so that the movements of the molds and the shifting cutter shall be synchronous. As best shown in Fig. 4, the shifting member 52 is mounted on trunnions 53 and 54 carried by suitable bearings in stud shafts 55 and 56. Mounted on stud shaft 55 is a swinging arm 57 which extends up parallel with member 52, and said arm has a segment-like toothed upper end, as is best shown in Fig. 3. Said arm and member 52 have interengaging ears, as is also shown in Fig. 3, whereby they are caused to move together. Another arm 61 extends back at right angles with arm 57, and is provided with corresponding segment-shaped toothed end which engages with the toothed end of said part 57. Arm 61 is carried by a vertical shaft 62 which extends up to a point alongside shaft 47 and has a second arm 63 upon its upper end, the two arms 61 and 63 thus constituting a lever, shaft 62 being the fulcrum. The arm 63 has a projecting point, preferably armed with an anti-friction roller 64, which extends into a cam groove in a wheel 65 on shaft 47. This cam groove is of such character that the parts operated thereby will remain at rest except for a brief time at two points in the revolution of shaft 47. When it reaches one of these points it will operate, through the devices described, to shift member 52 from one side to the other. In the meantime the same shaft 47, through connecting rod 43 or 44 and the corresponding pawl and ratchet, has moved one of the sets of molds, as previously described, so that an empty mold is always awaiting the stream of glass, the flow of which is shifted thereinto by the movement of the part 52, as has been described. I may here remark that the part 52 may be taken out, when desired, by merely withdrawing stud shaft 56 sufficiently so that trunnions 53 and 54 may become disengaged from their bearings.

The upper shear-member or part 51 is, as before stated, in the construction now being described, situated immediately over the shifting and cutting member or part 52. It is carried by a forked member 71. Said member is pivotally mounted at 72 and connected at its rear end to a spring support 73. This device operates to hold part 51 into close but yielding contact with part 52, thus both insuring a smooth cutting of the stream of molten glass, and also permitting a yielding of the parts in the event any hard substance should accidentally fall into said stream. As will be noticed, the parts 51 and 52 are preferably hollow, and, as shown in Fig. 1, they have cooling fluid pipes and connections 81, 82 and 83 connected thereto, thus providing for the cooling which is desirable in devices of this character.

The main frame 91 of this machine is shown as mounted on a sub-frame or base 92, upon which it may have a limited and adjustable movement, and is preferably provided with anti-friction trucks 93, 94 and 95 for the purposes of ease of operation. This adjustability is provided for by a rack 96 and pinion 97, the latter of which is operated by hand wheel 98. The proper tension of the mold carrying members 33 and 34 is provided for by adjusting screws 99. A number of other features of construction are illustrated in the drawings, in order to give an understanding of the operation of a complete machine, but these are not a part of my present invention, and are therefore only briefly described herein in order to give a clear idea of the complete operation.

In Figs. 7, 8 and 9 I have shown one alternative form of apparatus with which my invention may be used. That is to say, I have shown the mold-carrying tables of two rotary glass making machines, the two machines being adapted to be supplied from a single stream of molten glass by means of my present invention. I have also shown an alternative form of the shifting and cutting device.

In the construction illustrated by the views last above mentioned, the two tables 121 and 122, are mounted on suitable bases or pedestals, 123 and 124, and are operated, with a step-by-step movement, by means of swinging arms 125 and 126 carrying pawls on their ends, which engage with annular ratchets secured to the under sides of the tables, as shown by dotted lines in Fig. 7, the swinging arms 125 and 126 being operated by means of pitmen 127 and 128 connected to suitable cranks on a shaft 129.

The shifting cut-off 131 is operated by means of the swinging arm or lever 132 which is operated by cam wheel 133 on the same shaft 129 which operates the pitmen. The movements are so timed, as will be readily understood, as to bring a mold on one of the tables into position to be filled, and there let it remain at rest while being filled, and in the meantime bring forward a mold on the other table to position to be filled when the shifter is operated. The shifting cutter, in this case, is shown as comparatively small, and the remainder of the guiding operation is secured by a stationary inclined member 131', which is, to all intents and purposes, while the glass is flowing, a continuation of part 131. The principal difference between this construction and that first described is that in this construction the movable cutting member moves bodily instead of swinging on a pivot, and as said member is practically divided into two parts, one of which may remain stationary, a less ponderous device has to be moved in performing the cutting and flow-shifting operation. The shifting member 132, as in the other case, is composed of two arms and a central shaft connecting them, constituting a lever of which the shaft is the fulcrum, and is best shown in Fig. 9.

Positive interruption of the flow of a stream of molten glass on its way from the melting furnace to the mold sufficient to appreciably support it is objectionable, because in case of any support of the free end of the stream there is a slight chilling at the point of interruption which is detrimental to the product. Speedy cutting of the stream at the proper point below the outflow avoids this difficulty, because there is enough elasticity in the viscous stream of molten glass to cause a slight retraction of the severed end before the flow is resumed, when the cutters are properly positioned, thus preventing any tendency of the glass to pile up on the cutter, or have objectionable contact therewith. In the apparatus illustrated in my present application the cutter is sufficiently narrow and operates so quickly and is positioned at such a distance from the point of outflow that it does not support the fresh end of the continuously flowing stream of glass when it is severed.

Having thus fully described my said invention, what I claim as new, and desire to secure by Letters Patent, is—

1. The combination, with a single glass furnace and two sets of glass receivers, of means for deflecting the flow of a stream of glass into a receiver of each set alternately, embodying a cutting device by which the stream of glass is severed at the time the flow is shifted.

2. The combination, with a glass furnace and two sets of glass receivers, of a shear member positioned below the discharge orifice of the furnace past which the stream of glass from said orifice will flow, and a device positioned below said member and cooperating therewith for severing the stream of glass and deflecting the same into a receiver of each set alternately.

3. The combination, in a glass making machine, of a shear member past which a stream of glass will flow from the furnace, a plurality of sets of glass-receivers arranged to travel below said shear member, and a movable combined cutting and guiding device operating below said shear member whereby the same flowing stream of glass may be severed and directed alternately first to a receiver of one set and then to a receiver of the other set.

4. The combination, in a glass making machine, of a shear member past which a stream of glass will flow from the furnace, a plurality of sets of glass receivers arranged to travel below said member, and a movable combined cutting and guiding device interposed between said shear member and said sets of glass receivers and adapted to sever the same flowing stream of glass and shift the same from one to the other.

5. The combination, in a glass making machine, of a shear member past which a stream of glass will flow as it comes from the furnace, a plurality of sets of glass receivers arranged to travel below said shear member, means for imparting a step-by-step movement alternately to the set of glass receivers, a device interposed between the shear member and the sets of glass receivers for severing the said stream of glass and guiding it into a receiver first of one set and then of the other set, and means for moving said device connected to and operating synchronously with the means for imparting the step-by-step movement to the sets of glass receivers.

6. The combination, in a glass making machine, of a shear member positioned below the discharge orifice of the furnace, a plurality of sets of glass receivers arranged to travel below said shear member, means for imparting a step-by-step movement alternately to the sets of glass receivers, a device interposed between the shear member and the sets of glass receivers for severing a stream of glass and guiding it into a receiver first of one set and then of the other set, and means for moving said device connected to and operating synchronously with the means for imparting the step-by-step movement to the sets of glass receivers, consisting of a pivoted swinging lever engaging at one end with the severing and guiding device and at the other end with a wheel on the same shaft from which movement is imparted to the sets of glass receivers.

7. The combination, in a glass making machine, of a member past which a stream of molten glass from the furnace will flow, a plurality of sets of glass receivers arranged to travel below said member, a movable device interposed between said member and said glass receivers, means for shifting said device to sever a stream of glass and cause it to flow into a receiver first of one set and then of the other set, and yielding means whereby said member is held into close but yielding contact with the upper surface of said severing and guiding device.

8. The combination, in a glass making machine, of a member past which a stream of molten glass will flow from a furnace, a plurality of sets of glass receivers arranged to travel beneath said member, a driving shaft, connections from said driving shaft whereby a step-by-step movement is imparted alternately to each of said sets of glass receivers, a severing and guiding device interposed between said member and said set of glass receivers, and connections from the same shaft which operates the sets of receivers whereby said severing and guiding device is moved to periodically sever the said stream of glass and alternately direct it into a mold of one set or the other, the arrangement being such that the molds are at rest during the period the molten glass is being delivered thereinto.

9. The combination, in a glass making machine, of a shear member past which a stream of molten glass will flow from a furnace, a plurality of sets of glass receivers arranged to travel beneath said shear member, a circular ratchet connected to the driving member of each set of glass receivers, a pawl adapted to engage with each ratchet, a pitman connecting said pawl with a crank on the driving shaft, said driving shaft, a severing and guiding member interposed between the shear member and the sets of glass receivers to intermittently sever and alternately deflect said stream of glass, a cam on the same shaft which operates said pitman, and an arm engaging with said severing and guiding device and with said cam whereby the former is operated from the latter, the arrangement being such that the step-by-step movement of the sets of glass receivers and the movement of the severing and guiding device is synchronous.

10. The combination, with a glass furnace delivering a flowing stream of molten glass, of a cutter-deflector having two delivery surfaces over either of which the glass-stream may flow, other cutting means coöperating with the cutter-deflector for intermittently severing the flowing stream immediately above the cutter-deflector, and means for alternating the relation between the stream and the two faces of the cutter-deflector whereby the stream may alternately flow over said two faces.

11. A glass working machine comprising a deflector-cutter having a glass-shearing upper edge and a pair of opposite glass-stream guiding faces, shearing means coöperating with the shearing edge of the deflector-cutter to shear a flowing stream of glass, and means for shifting the shearing members relative to each other to bring the stream-guiding faces alternately with stream-receiving positions.

12. A glass-working machine comprising a deflector-cutter having a glass-shearing upper edge and a pair of opposite glass-stream guiding faces, shearing means coöperating with the shearing edge of the deflector-cutter to shear a stream of glass, and means for reciprocating the deflector-cutter to bring its stream-guiding faces alternately into stream-receiving positions.

13. The combination, with a glass furnace delivering a flowing stream of molten glass, of two sets of receivers, means for advancing the said receivers through successive positions, and a glass shearing device interposed between the discharge orifice of the furnace and the two sets of glass receivers, said shearing device comprising co-acting members capable of shearing the stream of glass at an intermediate point in its length, and a deflector arranged to be intermittently thrown to one side or the other of the normal path of flow of the freshly severed end of the glass stream to deflect said glass stream to a receptacle of one set, the arrangement being such that the glass stream will be delivered into one or the other set of receptacles alternately.

14. The combination, with a glass furnace delivering a flowing stream of molten glass, of two sets of receivers, means for advancing the said receivers through successive positions, and a glass shearing device interposed between the discharge orifice of the furnace and the two sets of glass receivers, said shearing device comprising co-acting members capable of shearing the stream of glass, and a deflector arranged to be intermittently thrown to one side or the other of the normal path of flow of the freshly severed end of the glass stream to deflect said glass stream to a receptacle of one set, the arrangement being such that the glass stream will be delivered into one or the other set of receptacles alternately.

15. A glass working machine comprising two sets of receivers for molten glass, means for shifting said receivers through successive positions, a cutting mechanism arranged above said sets of receptacles at one point in their paths of travel, said cutting mechanism being adapted to sever a flowing stream of glass at a point intermediate its length, a deflector, and means for carrying said deflector alternately to one side or the other of the normal path of travel of the freshly cut end of the stream of glass at alternate cuttings of said stream, whereby the glass stream will be delivered into one or the other set of receptacles alternately.

16. A glass working machine comprising two sets of receivers for molten glass, means for shifting said receivers through successive positions, a cutting mechanism arranged above said sets of receptacles at one point in their paths of travel, said cutting mechanism being adapted to sever a flowing stream of glass, a deflector, and means for carrying said deflector alternately to one side or the other of the normal path of travel of the freshly cut end of the stream of glass at alternate cuttings of said stream, whereby the glass stream will be delivered into one or the other set of receptacles alternately.

In witness whereof, I have hereunto set my hand and seal at Muncie, Indiana, this 10th day of January, A. D. one thousand nine hundred and ten.

ALVAH L. BINGHAM. [L. S.]

Witnesses:
WM. C. DICKIE,
MORRIS L. HOGEMAN.